(12) United States Patent
Maki et al.

(10) Patent No.: US 12,690,036 B2
(45) Date of Patent: \*Jul. 21, 2026

(54) MOBILE STATION, BASE STATION, TRANSMISSION METHOD AND RECEPTION METHOD

(71) Applicant: Panasonic Intellectual Property Corporation of America, Torrance, CA (US)

(72) Inventors: Shotaro Maki, Kanagawa (JP); Takashi Iwai, Ishikawa (JP); Tomofumi Takata, Ishikawa (JP)

(73) Assignee: Panasonic Intellectual Property Corporation of America, Torrance, CA (US)

( \* ) Notice: Subject to any disclaimer, the term of this patent is extended or adjusted under 35 U.S.C. 154(b) by 208 days.

This patent is subject to a terminal disclaimer.

(21) Appl. No.: 18/647,519

(22) Filed: Apr. 26, 2024

(65) Prior Publication Data

US 2024/0298316 A1 Sep. 5, 2024

Related U.S. Application Data

(63) Continuation of application No. 17/421,351, filed as application No. PCT/JP2019/035793 on Sep. 12, 2019, now Pat. No. 12,004,155.

(30) Foreign Application Priority Data

Jan. 9, 2019 (JP) ................................. 2019-001858

(51) Int. Cl.
*H04W 72/1268* (2023.01)
*H04L 1/00* (2006.01)
(Continued)

(52) U.S. Cl.
CPC ....... *H04W 72/1268* (2013.01); *H04L 1/0051* (2013.01); *H04W 72/0453* (2013.01); *H04W 72/20* (2023.01)

(58) Field of Classification Search
CPC ............. H04W 72/04; H04W 72/1268; H04W 72/0453; H04W 72/20; H04W 72/23;
(Continued)

(56) References Cited

U.S. PATENT DOCUMENTS 10,856,282 B2 12/2020 Hamidi-Sepehr et al.
2013/0039305 A1\* 2/2013 Kishiyama ........ H04W 72/1263
370/329
(Continued)

FOREIGN PATENT DOCUMENTS

JP 2013062848 A 4/2013

OTHER PUBLICATIONS

3GPP TS 36.213 V15.13.0, "3rd Generation Partnership Project; Technical Specification Group Radio Access Network; Evolved Universal Terrestrial Radio Access (E-UTRA); Physical layer procedures (Release 15)," Mar. 2021, 556 pages.
(Continued)

*Primary Examiner* — Mohamed A Kamara
(74) *Attorney, Agent, or Firm* — Seed Intellectual Property Law Group LLP

(57) ABSTRACT

Provided is a mobile station that can appropriately allocate resources in an unlicensed band. In the mobile station (200), on the basis of resource association between an uplink reference signal and another uplink signal different from the reference signal, a control unit (205) determines a frequency resource to be used for uplink transmission. A transmission unit (209) uses the frequency resource to transmit at least one of the reference signal and the other uplink signal.

7 Claims, 13 Drawing Sheets

(51) Int. Cl.
H04W 72/0453 (2023.01)
H04W 72/20 (2023.01)

(58) Field of Classification Search
CPC ........ H04W 16/14; H04L 1/0051; H04L 5/00;
H04L 5/0044; H04L 5/0051; H04L
5/0094
See application file for complete search history.

(56) References Cited

U.S. PATENT DOCUMENTS

| | | | |
|---|---|---|---|
| 2018/0092043 A1 | 3/2018 | Yerramalli et al. | |
| 2019/0274162 A1 | 9/2019 | Zhang et al. | |
| 2019/0357194 A1* | 11/2019 | Hwang | H04L 5/0094 |
| 2021/0329634 A1 | 10/2021 | Kim et al. | |
| 2024/0098785 A1* | 3/2024 | Noh | H04W 74/0808 |

OTHER PUBLICATIONS

3GPP TS 37.213 V15.1.0, "3rd Generation Partnership Project; Technical Specification Group Radio Access Network; Physical layer procedures for shared spectrum channel access (Release 15)," Sep. 2018, 20 pages.

3GPP TS 38.101-1 V15.3.0, "3rd Generation Partnership Project; Technical Specification Group Radio Access Network; NR; User Equipment (UE) radio transmission and reception; Part 1: Range 1 Standalone (Release 15)," Sep. 2018, 219 pages.

ETSI EN 301 893 V2.1.1, "5 GHz RLAN; Harmonised Standard covering the essential requirements of article 3.2 of Directive 2014/53/EU," May 2017, 122 pages.

Ericsson, "Feature lead summary 2 for UL Signals and Channels," R1-1814137, Agenda Item: 7.2.2.3.2, 3GPP TSG RAN WG1 Meeting #95, Spokane, USA, Nov. 12-16, 2018. (16 pages).

International Search Report, mailed Oct. 15, 2019, for corresponding International Application No. PCT/JP2019/035793, 4 pages.

NTT Docomo, Inc., "Revised WID on New Radio Access Technology," RP-181726 (revision of RP-181474), Agenda Item: 9.2.1, 3GPP TSG RAN Meeting #81, Gold Coast, Australia, Sep. 10-13, 2018, 12 pages.

Qualcomm Inc., "New WID on NR-based Access to Unlicensed Spectrum," RP-182878 (revision of RP-182806), Agenda Item: 9.1.1, 3GPP TSG RAN Meeting #82, Sorrento, Italy, Dec. 10-13, 2018, 8 pages.

* cited by examiner

| SRS request | Triggered aperiodic SRS set(s) |
|:-----------:|:------------------------------:|
| 00 | No aperiodic SRS |
| 01 | SRS resource set(s) #1 |
| 10 | SRS resource set(s) #2 |
| 11 | SRS resource set(s) #3 |

| SRS request | SRS RESOURCE TO BE USED |
|:-:|:-:|
| 00 | No SRS |
| 01 | SRS resource #1 (CYCLIC SHIFT NUMBER #1) |
| 10 | SRS resource #2 (CYCLIC SHIFT NUMBER #2) |
| 11 | SRS resource #3 (CYCLIC SHIFT NUMBER #3) |

FIG. 8

| SRS CYCLIC SHIFT NUMBER | FREQUENCY RESOURCE ALLOCATED FOR PUSCH |
|:-:|:-:|
| #1 | Entire interlace indicated by RIV |
| #2 | Cluster numbers #0 to #4 in interlace indicated by RIV (partial interlace) |
| #3 | Cluster numbers #5 to #8 in interlace indicated by RIV (partial interlace) |
| ⋮ | ⋮ |

FIG. 9

| SRS request | SRS RESOURCE TO BE USED |
|---|---|
| 00 | No SRS |
| 01 | SRS resource #1 (TEMPORAL POSITION #A) |
| 10 | SRS resource #2 (TEMPORAL POSITION #B) |
| 11 | SRS resource #3 (TEMPORAL POSITION #C) |

FIG. 10

| TEMPORAL POSITION OF SRS RESOURCE | FREQUENCY RESOURCE ALLOCATED FOR PUSCH |
|---|---|
| #A (After PUSCH in the same slot) | Entire interlace indicated by RIV |
| #B (Before PUSCH in the same slot) | Cluster numbers #0 to #4 in interlace indicated by RIV (partial interlace) |
| #C (Before PUSCH in the same slot) | Cluster numbers #5 to #8 in interlace indicated by RIV (partial interlace) |
| ⋮ | ⋮ |

FIG. 11

| SRS resource | | FREQUENCY RESOURCE ALLOCATED FOR PUSCH |
|---|---|---|
| SRS TEMPORAL POSITION | SRS CYCLIC SHIFT NUMBER | |
| #A (After PUSCH) | #0 | Entire interlace indicated by RIV |
| #B (Before PUSCH) | #1 | Cluster numbers #0 to #4 in interlace indicated by RIV (partial interlace) |
| | #2 | Cluster numbers #5 to #8 in interlace indicated by RIV (partial interlace) |
| ⋮ | ⋮ | ⋮ |

FIG. 12

| SRS request | SRS RESOURCE TO BE USED |
|:---:|:---:|
| 00 | No SRS |
| 01 | SRS resource #1 |
| 10 | SRS resource #2 |
| 11 | SRS resource #3<br>(Frequency resource for SRS is selected from<br>frequency resource allocated for PUSCH) |

FIG. 14

| SRS request | SRS RESOURCE TO BE USED |
|:---:|:---:|
| 00 | No SRS |
| 01 | SRS resource #1 (TEMPORAL POSITION #A) |
| 10 | SRS resource #2 (TEMPORAL POSITION #B) |
| 11 | SRS resource #3 (TEMPORAL POSITION #C) |

MOBILE STATION, BASE STATION, TRANSMISSION METHOD AND RECEPTION METHOD

TECHNICAL FIELD

The present disclosure relates to a mobile station, a base station, a transmission method, and a reception method.

BACKGROUND ART

A communication system called the 5th generation mobile communication system (5G) has been studied. The 3rd Generation Partnership Project (3GPP), an international standards-developing organization, has been studying development of the 5G communication system in terms of both the development of LTE/LTE-Advanced systems and a New Radio Access Technology (also referred to as New RAT or NR), which is a new method not necessarily backward compatible with the LTE/LTE-Advanced systems (see, for example, Non-Patent Literature (hereinafter referred to as "NPL") 1).

Studies have been conducted on operating the NR in unlicensed bands in addition to licensed bands as is the case with License-Assisted Access (LAA) or Enhanced LAA (eLAA) of the LTE (see, for example, NPL 2). The operation in unlicensed bands is also called, for example, NR-based Access to Unlicensed Spectrum or NR-U.

CITATION LIST

Non-Patent Literature

NPL 1
RP-181726, "Revised WID on New Radio Access Technology", NTT DOCOMO, September 2018
NPL 2
RP-182878, "New WID on NR-based Access to Unlicensed Spectrum", Qualcomm, December 2018
NPL 3
ETSI EN 301 893 V2.1.1, "5 GHz RLAN; Harmonised Standard covering the essential requirements of article 3.2 of Directive 2014/53/EU," May 2017
NPL 4
3GPP TS 38.101-1 V15.3.0, "NR; User Equipment (UE) radio transmission and reception; Part 1: Range 1 Standalone (Release 15)," September 2018
NPL 5
3GPP TS 36.213 V15.3.0, "Evolved Universal Terrestrial Radio Access (E-UTRA); Physical layer procedures (Release 15)," September 2018
NPL 6
3GPP TS 37.213 V15.1.0, "Physical layer procedure for shared spectrum channel access (Release 15)," September 2018

SUMMARY OF INVENTION

However, resource allocation methods in unlicensed bands have not been comprehensively studied.

One non-limiting and exemplary embodiment facilitates providing a mobile station, a base station, a transmission method, and a reception method each capable of appropriately allocating resources in unlicensed bands.

A mobile station according to an embodiment of the present disclosure includes: control circuitry, which, in operation, determines a frequency resource used for uplink transmission based on association of resources between a reference signal of uplink and an uplink signal other than the reference signal; and transmission circuitry, which, in operation, transmits at least one of the reference signal and/or the uplink signal using the frequency resource.

It should be noted that general or specific embodiments may be implemented as a system, a method, an integrated circuit, a computer program, a storage medium, or any selective combination thereof.

According to an embodiment of the present disclosure, it is possible to appropriately allocate resources in unlicensed bands.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 illustrates exemplary SRS request parameters;
FIG. 8 illustrates exemplary SRS requests according to Operation Example 1 in Embodiment 1;
FIG. 9 illustrates exemplary association between cyclic shift numbers and frequency resources allocated for PUSCH according to Operation Example 1 in Embodiment 1;
FIG. 10 illustrates exemplary SRS requests according to Operation Example 2 in Embodiment 1;
FIG. 11 illustrates exemplary associations between temporal positions and the frequency resources allocated for PUSCH according to Operation Example 2 in Embodiment 1;
FIG. 12 illustrates other exemplary association among the cyclic shift numbers, the temporal positions, and the frequency resources allocated for PUSCH according to Embodiment 1;
FIG. 14 illustrates exemplary SRS requests according to Embodiment 2;
FIG. 16 illustrates exemplary SRS requests according to Embodiment 3.

DESCRIPTION OF EMBODIMENTS

Hereinafter, embodiments of the present disclosure will be described in detail with reference to the accompanying drawings.

[Interlace Allocation]

In unlicensed bands, the upper limit of Power Spectral Density (PSD) is defined by laws, regulations, and standards, for example. A standard of the European Telecommunications Standards Institute (ETSI), for example, imposes the upper limit of 10 dBm/MHz (17 dBm/MHz depending on the band) for the PSD in a band called a 5 GHz band on mobile stations (e.g., also referred to as terminals or User Equipment (UE)) having a power control function (see, for example, NPL 3).

In order for the mobile stations to transmit signals with higher transmission power under this limitation of the PSD, it is effective to map (allocate) signals by spreading (or dispersing) over resources in frequency domain (hereinafter referred to as frequency resources). For NR-U, studies have been carried out on an allocation method called "interlace allocation", for example.

A certain band (e.g., 20 MHz) is divided into a plurality of interlaces in the interlace allocation. The interlace includes, for example, a plurality of groups of consecutive subcarriers. One group of consecutive subcarriers may be, for example, one Physical Resource Block (PRB; one PRB includes 12 subcarriers). The plurality of groups of consecutive subcarriers constituting a single interlace are arranged dispersedly at equal or unequal intervals in the frequency domain.

Further, different interlaces have different frequency resources from each other, for example. In other words, the frequency resources constituting each interlace do not overlap with each other.

In frequency bands lower than 6 GHz in NR, for example, the maximum allocated number of PRBs in the 20 MHz band is 106, 53, and 26 for Subcarrier Spacing (SCS) of 15 kHz, 30 kHz, and 60 kHz, respectively (see, for example, NPL 4).

In the unlicensed bands of NR (e.g., the frequency band lower than 7 GHz), the interlace configuration has been studied based on the maximum allocated number of PRBs described above.

3GPP NR-U has been studying a plurality of combinations of M and N where the 20 MHz band is divided into M interlaces, and each of the M interlaces includes N PRBs (e.g., corresponding to the subcarrier groups described above), for example. M and N are examples of parameters indicating the interlace configuration. Additionally, in a case where the maximum allocated number of PRBs is not a multiple of M, certain interlaces possibly include one more PRB than the number of PRBs (e.g., N) included in each of the other interlaces.

By way of example, a case where M=12 has been studied assuming that the subcarrier spacing is 15 kHz. As described above, when the subcarrier spacing is 15 kHz, the maximum allocated number of PRBs is 106, which is not a multiple of M=12. Thus, in the case where M=12, certain interlaces include 9 PRBs (N=9) and the other interlaces each include 8 PRBs (N=8).

Figure 1:
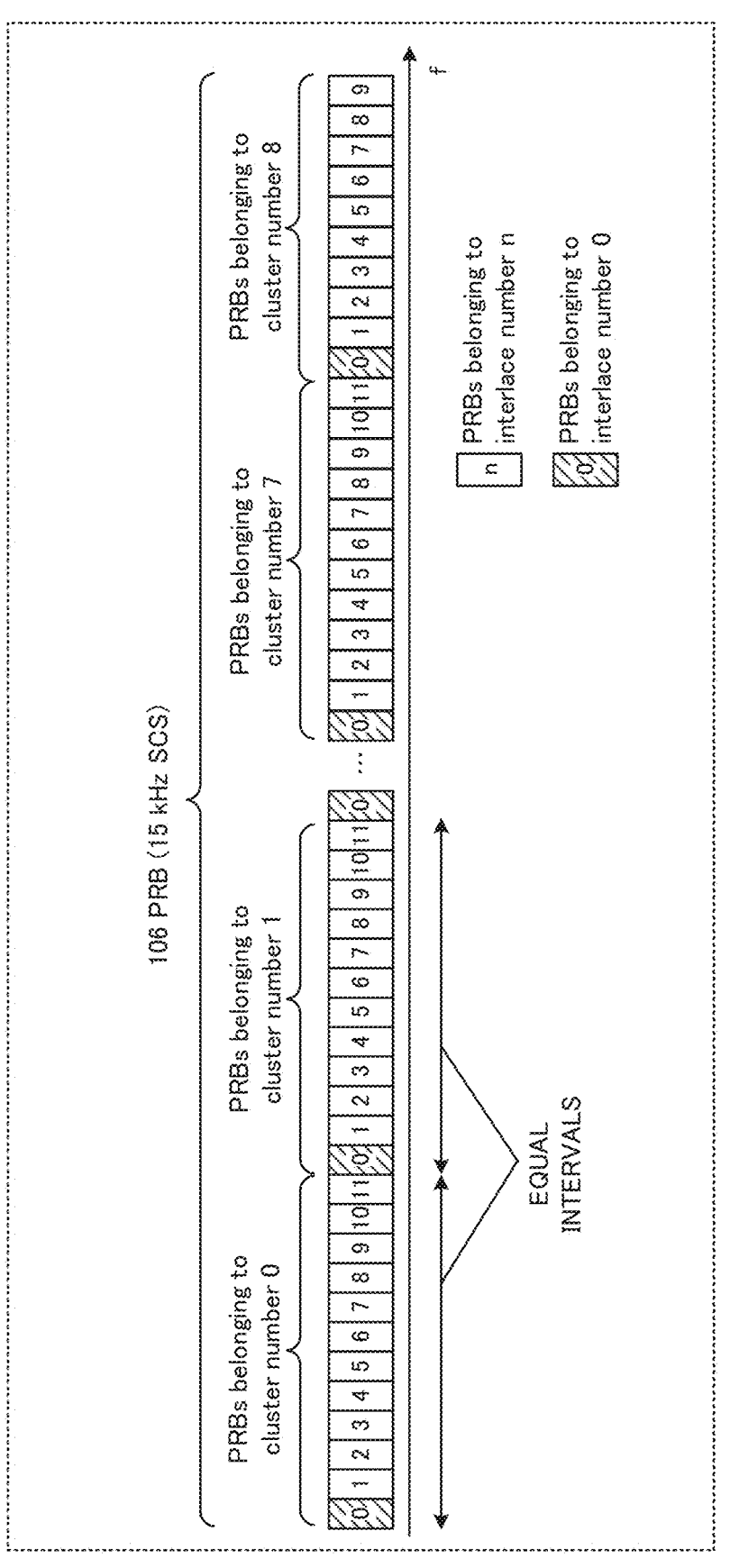
FIG. 1 illustrates exemplary interlace allocation.

FIG. 1 illustrates an exemplary interlace configuration for the above-described case (SCS=15 KHz, M=12, and N=8 or 9).

In the example of FIG. 1, the 20 MHz band (106 PRBs) is divided into M=12 interlaces. The 12 interlaces have interlace numbers (or also referred to as interlace indexes) of 0 to 11, respectively.

In addition, the n-th PRB from the lower frequency among the PRBs belonging to each interlace is sometimes referred to as a "PRB belonging to cluster number n". The example in FIG. 1 has 9 clusters with cluster numbers #0 to #8.

For example, eLAA assumes interlace allocation for uplink data channels (e.g., a Physical Uplink Shared CHannel (PUSCH)). An indication method for the interlace allocation in eLAA is, for example, an indication method based on an interlace number of an interlace to which the PUSCH is mapped. According to Uplink resource allocation type 3 disclosed in NPL 5, for example, a Resource Indication Value (RIV) is indicated to a mobile station. The mobile station derives the interlace number of the interlace to which the PUSCH is mapped, based on the RIV. Note that the interlace allocation in eLAA does not allow the indication of "mapping the PUSCH to a part of the interlace (e.g., some of the PRBs)".

Meanwhile, NR-U considers interlace allocation for uplink channels or reference signals (e.g., a Sounding Reference Signal (SRS)). Note that the uplink channels include, for example, a PUSCH, an uplink control channel (e.g., a Physical Uplink Control CHannel (PUCCH)), and a random access channel (e.g., a Physical Random Access CHannel (PRACH)).

NR-U also considers a method of allocating a signal to the PRBs belonging to some clusters among the PRBs included in the interlace. Hereinafter, the method of allocating a signal to the PRBs belonging to some clusters among the PRBs included in the interlace is referred to as "partial interlace allocation".

Utilization of the partial interlace enables Frequency Division Multiplexing (FDM) of signals from a plurality of mobile stations in a single interlace, thereby improving resource allocation efficiency.

However, the uplink resource allocation type 3 of eLAA does not assume the indication of the partial interlace allocation as mentioned above. Also, studies have not been fully conducted on indication methods for the partial interlace allocation in LTE and NR-U.

Thus, the indication methods for the partial interlace allocation will be described in an embodiment of the present disclosure (see, for example, Embodiment 1 to be described later).

In the case of the partial interlace allocation, an Occupied Channel Bandwidth (OCB) is narrower than in a case of allocation to all PRBs belonging to the interlace. For example, the ETSI defines that "as long as some signals satisfy a requirement of the OCB being 80-100% of the total bandwidth (hereinafter, also referred to as an OCB requirement), the OCB of other signals may be less than 80% during the same Channel Occupancy Time (COT)" (see, for example, NPL 3).

The case of using the partial interlace possibly fails to satisfy the above-described OCB requirement of 80-100% for a mobile station using the partial interlace. Thus, in order to satisfy the OCB requirement in accordance with the above-described specification when the partial interlace allocation is applied to the PUSCH, it is assumed that a different signal (e.g., the SRS) to be transmitted at a timing different from a transmission timing of the PUSCH during the same COT is transmitted so as to satisfy the OCB requirement, for example.

[SRS]

In NR-U, it is assumed that mobile stations transmit SRSs as in eLAA or NR Release 15 (NR Rel-15). The purpose of the SRS is to estimate channel quality of uplink in a resource of the SRS by a base station (e.g., also referred to as gNB) received the SRS.

Also, NR-U possibly adopts an aperiodic SRS as in eLAA or NR Rel-15. The aperiodic SRS is an SRS whose transmission is dynamically indicated (or triggered) by an "SRS request" field included in Downlink Control Information (DCI), for example. FIG. 2 illustrates exemplary SRS request indications.

The mobile station may transmit the SRS using a resource (e.g., an "SRS resource") included in the SRS resource set associated with a value of the indicated SRS request (any of 00 to 11 in FIG. 2). Note that the SRS resource may include information such as a resource (e.g., a time resource and a frequency resource) for mapping the SRS, the number of symbols (i.e., duration), a cyclic shift number of the SRS sequence, or a comb number, for example.

The SRS resource is also a higher layer parameter indicated from the base station to the mobile station in a higher layer, for example. In FIG. 2 for example, the mobile station may control the transmission of the SRS using the SRS resource set corresponding to the value of the SRS request indicated by the DCI, among the SRS resource sets including the SRS resource indicated by the higher layer.

The interlace allocation for the SRS is also considered in NR-U. Mapping the SRS to the interlace facilitates the frequency division multiplexing of the SRS with signals of other uplink channels such as the PUSCH, the PUCCH or the PRACH (e.g., transmitted by other mobile stations) allocated to the interlace as well as the SRS, for example.

In NR Rel-15, the resource for the SRS (e.g., the frequency resource and the time resource) is configured by the SRS resource, which is the higher layer parameter, as described above.

However, the SRS resource configurable in LTE or NR is not a resource assuming the interlace allocation, and studies have not been fully conducted on how the interlace allocation for the SRS is indicated.

Thus, the indication methods for the partial interlace allocation will be described in an embodiment of the present disclosure (see, for example, Embodiment 2 or 3 to be described later).

Further, in NR Rel-15, time division multiplexing (TDM) is possible for the SRS and the PUSCH transmitted by the same mobile station while frequency division multiplexing (FDM) and code division multiplexing (CDM) are not assumed. As in NR Rel-15, the SRS and the PUSCH transmitted by the same mobile station can be time-division multiplexed in NR-U.

Further, it is assumed in NR Rel-15 that the SRS is mapped to a symbol after the PUSCH in the same slot. In addition, the SRS is assumed to be allocated, for example, to the back 6 symbols of the slot. It is considered in NR-U, in contrast, eliminating the limitations on the allocation of the SRS as in NR Rel-15, and allowing the SRS to be allocated to any symbol in the slot. For example, it is considered performing the time division multiplexing by mapping the SRS to a symbol prior to the PUSCH in the same slot. The SRS mapped to a symbol prior to the PUSCH is referred to as a "front-loaded SRS", for example.

Embodiment 1

In the present embodiment, a method of indicating the partial interlace allocation will be described.
[Overview of Communication System]

The communication system according to the present embodiment includes base station (corresponding to a receiver) 100 and mobile station (corresponding to a transmitter) 200.

Figure 3:
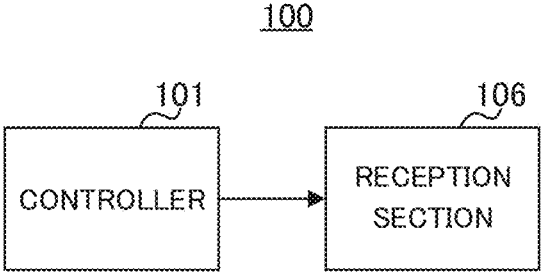
FIG. 3 is a block diagram illustrating an example of a configuration of part of a base station according to Embodiment 1.

FIG. 3 is a block diagram illustrating an example of a configuration of part of base station 100 according to the present embodiment. In base station 100 illustrated in FIG. 3, controller (corresponding to control circuitry) 101 determines frequency resources used for uplink transmission based on resource association between an uplink reference signal (e.g., SRS) and an uplink signal (e.g., PUSCH) other than the reference signal. Reception section 106 receives at least one of the reference signal and the uplink signal other than the reference signal using the frequency resource.

Figure 4:
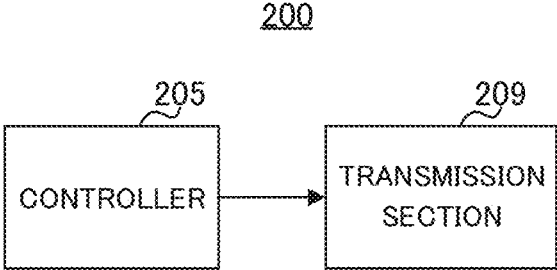
FIG. 4 is a block diagram illustrating an example of a configuration of part of a mobile station according to Embodiment 1.
Figure 5:
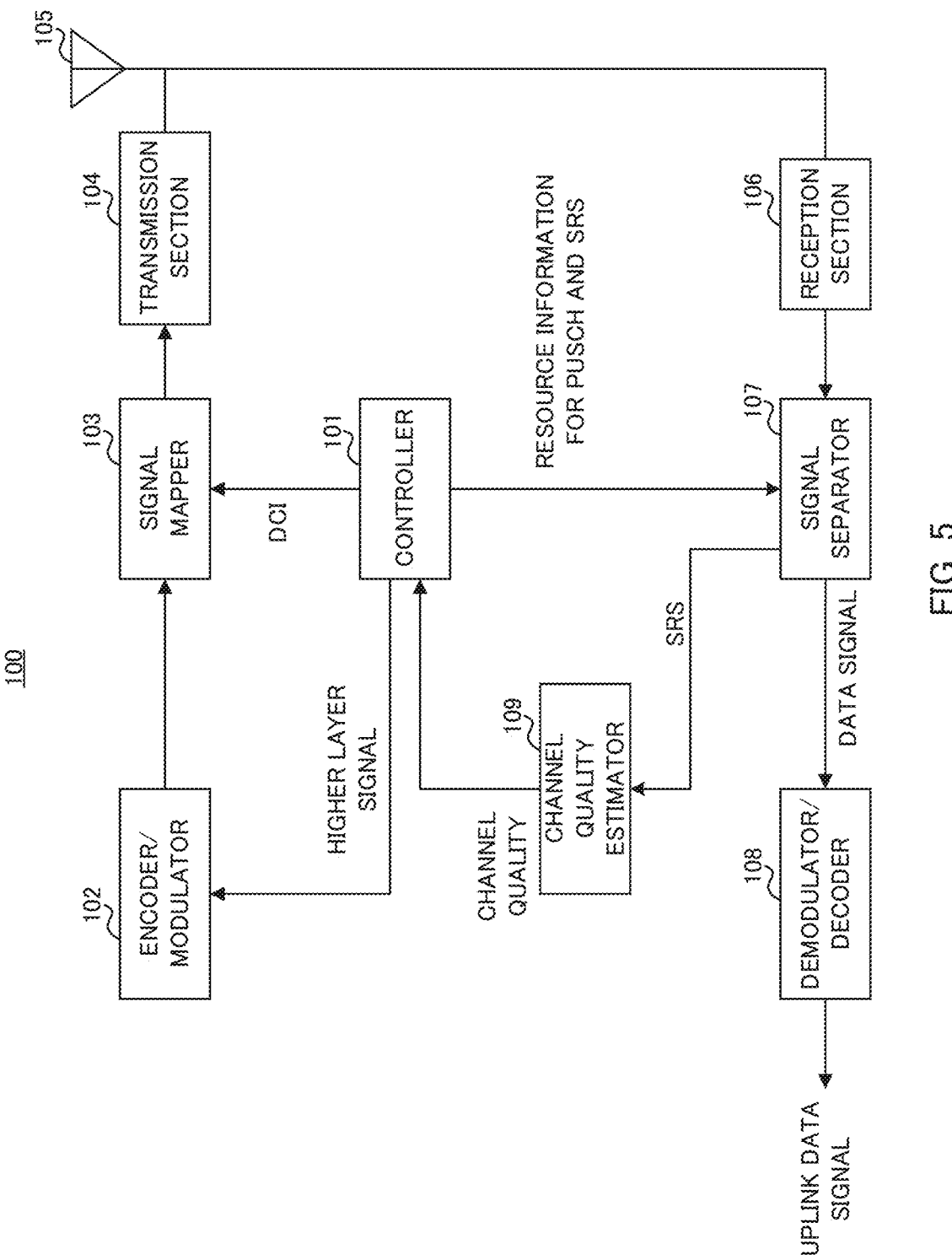
FIG. 5 is a block diagram illustrating an example of the configuration of the base station according to Embodiment 1.

FIG. 4 is a block diagram illustrating an example of a configuration of part of mobile station 200 according to the present embodiment. In mobile station 200 illustrated in FIG. 4, controller (corresponding to control circuitry) 205 determines frequency resources used for uplink transmission based on resource association between an uplink reference signal (e.g., SRS) and an uplink signal (e.g., PUSCH) other than the reference signal. Transmission section 209 transmits at least one of the reference signal and the uplink signal other than the reference signal using the frequency resource.
[Configuration of Base Station] FIG. 5 is a block diagram illustrating an example of the configuration of base station 100 according to the present embodiment. In FIG. 5, base station 100 includes controller 101, encoder/modulator 102, signal mapper 103, transmission section 104, antenna 105, reception section 106, signal separator 107, demodulator/decoder 108, and channel quality estimator 109.

Controller 101 determines, for example, a configuration of one or more resources for the SRS (e.g., the SRS resource set or the SRS resource illustrated in FIG. 2), and outputs a higher layer signal including information indicating the determined resource configuration for the SRS to encoder/modulator 102.

Controller 101 also schedules an uplink data signal (e.g., a PUSCH signal) and allocates the resource for the SRS (e.g., the SRS resource), based on a channel quality estimate inputted from channel quality estimator 109. Controller 101 then generates PUSCH scheduling information and SRS resource information. The PUSCH scheduling information includes, for example, a configuration of a Modulation and Coding Scheme (MCS), PUSCH resource allocation information (e.g., RIV), and transmit power control information. Controller 101 outputs downlink control information (e.g., DCI) including at least one of the generated scheduling information and SRS resource allocation information to signal mapper 103. Controller 101 also outputs the resource information indicating resource allocation for the PUSCH and the SRS to signal separator 107.

Encoder/modulator 102 performs error correction coding and modulation on the higher layer signal inputted from controller 101, and outputs the modulated signal to signal mapper 103.

Signal mapper 103 maps the signal inputted from encoder/modulator 102 or the DCI inputted from controller 101 to resources in time domain and frequency domain. Signal mapper 103 outputs the signal mapped to the resources to transmission section 104.

Transmission section 104 performs radio transmission processing such as frequency conversion using a carrier wave on the signal inputted from signal mapper 103, and outputs the signal obtained by the radio transmission processing to antenna 105.

Antenna 105 radiates the signal (i.e., a downlink signal) inputted from transmission section 104 toward mobile station 200. Antenna 105 also outputs an uplink signal (e.g., including the PUSCH and the SRS) received from mobile station 200 to reception section 106.

Reception section 106 performs radio reception processing such as frequency conversion on the signal inputted from antenna 105, and outputs the signal obtained by the radio reception processing to signal separator 107.

Signal separator 107 separates the PUSCH and the SRS from the signal inputted from reception section 106 based on the resource information inputted from controller 101. Signal separator 107 outputs a data signal included in the separated PUSCH to demodulator/decoder 108, and outputs the SRS to channel quality estimator 109.

Demodulator/decoder 108 demodulates and decodes the data signal inputted from signal separator 107, and outputs the uplink data signal.

Channel quality estimator 109 calculates a channel quality estimate based on the SRS inputted from signal separator 107, and outputs the channel quality estimate to controller 101.

[Configuration of Mobile Station]

Figure 6:
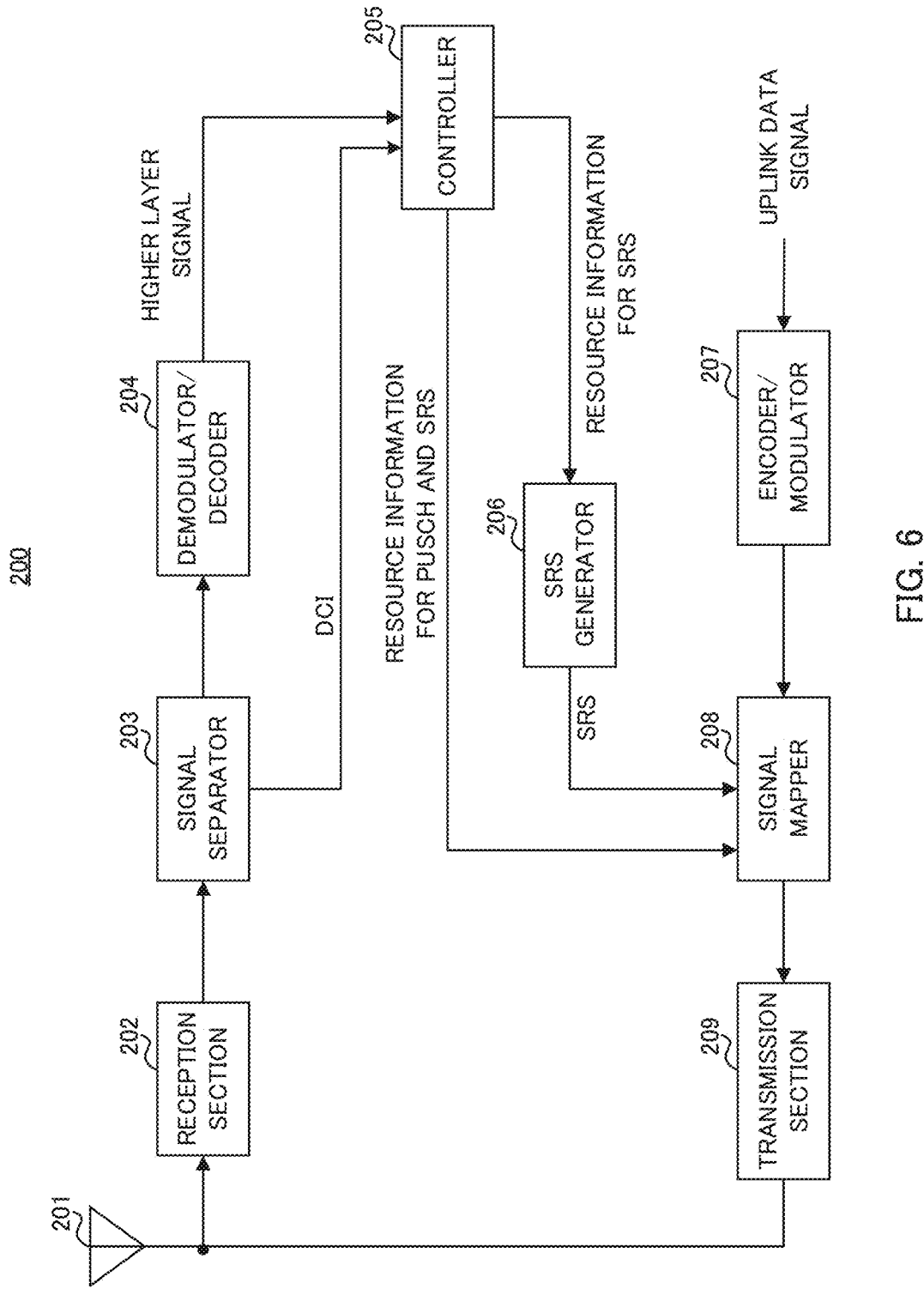
FIG. 6 is a block diagram illustrating an example of the configuration of the mobile station according to Embodiment 1.

FIG. 6 is a block diagram illustrating an example of the configuration of mobile station 200 according to the present embodiment. In FIG. 6, mobile station 200 includes antenna 201, reception section 202, signal separator 203, demodulator/decoder 204, controller 205, SRS generator 206, encoder/modulator 207, signal mapper 208, and transmission section 209.

Antenna 201 receives the downlink signal transmitted by base station 100 (see, for example, FIG. 5), and outputs the signal to reception section 202. Antenna 201 also radiates an uplink signal inputted from transmission section 209 toward base station 100.

Reception section 202 performs radio reception processing such as frequency conversion on the signal inputted from antenna 201, and outputs the signal obtained by the radio reception processing to signal separator 203.

Signal separator 203 separates, for example, the data signal and the DCI from the signal inputted from reception section 202. Signal separator 203 outputs, of the separated signal, the data signal to demodulator/decoder 204 and the DCI to controller 205.

Demodulator/decoder 204 demodulates and decodes the data signal inputted from signal separator 203. Demodulator/decoder 204 outputs the higher layer signal obtained by the decoding to controller 205.

Controller 205 derives resources allocated for the PUSCH and the SRS indicated from base station 100 based on the higher layer signal inputted from demodulator/decoder 204 and the DCI inputted from signal separator 203. Controller 205 outputs the resource information for the PUSCH and the SRS to signal mapper 208, and outputs the resource information for the SRS to SRS generator 206.

SRS generator 206 generates the SRS based on the SRS resource information inputted from controller 205, and outputs the SRS to signal mapper 208.

Encoder/modulator 207 performs error correction coding and modulation on the uplink data signal, and outputs the modulated signal to signal mapper 208.

Signal mapper 208 maps the signal inputted from encoder/modulator 207 and the SRS inputted from SRS generator 206 to the resources in the time and frequency domains, based on the resource information for the PUSCH and the SRS inputted from controller 205. Signal mapper 208 outputs the signals mapped to the resources to transmission section 209.

Transmission section 209 performs radio transmission processing such as frequency conversion using a carrier wave on the signals inputted from signal mapper 208, and outputs the signals obtained by the radio transmission processing to antenna 201.

[Operation Examples of Base Station 100 and Mobile Station 200]

Next, operation examples of base station 100 (see FIG. 5) and mobile station 200 (see FIG. 6) will be described.

Figure 7:
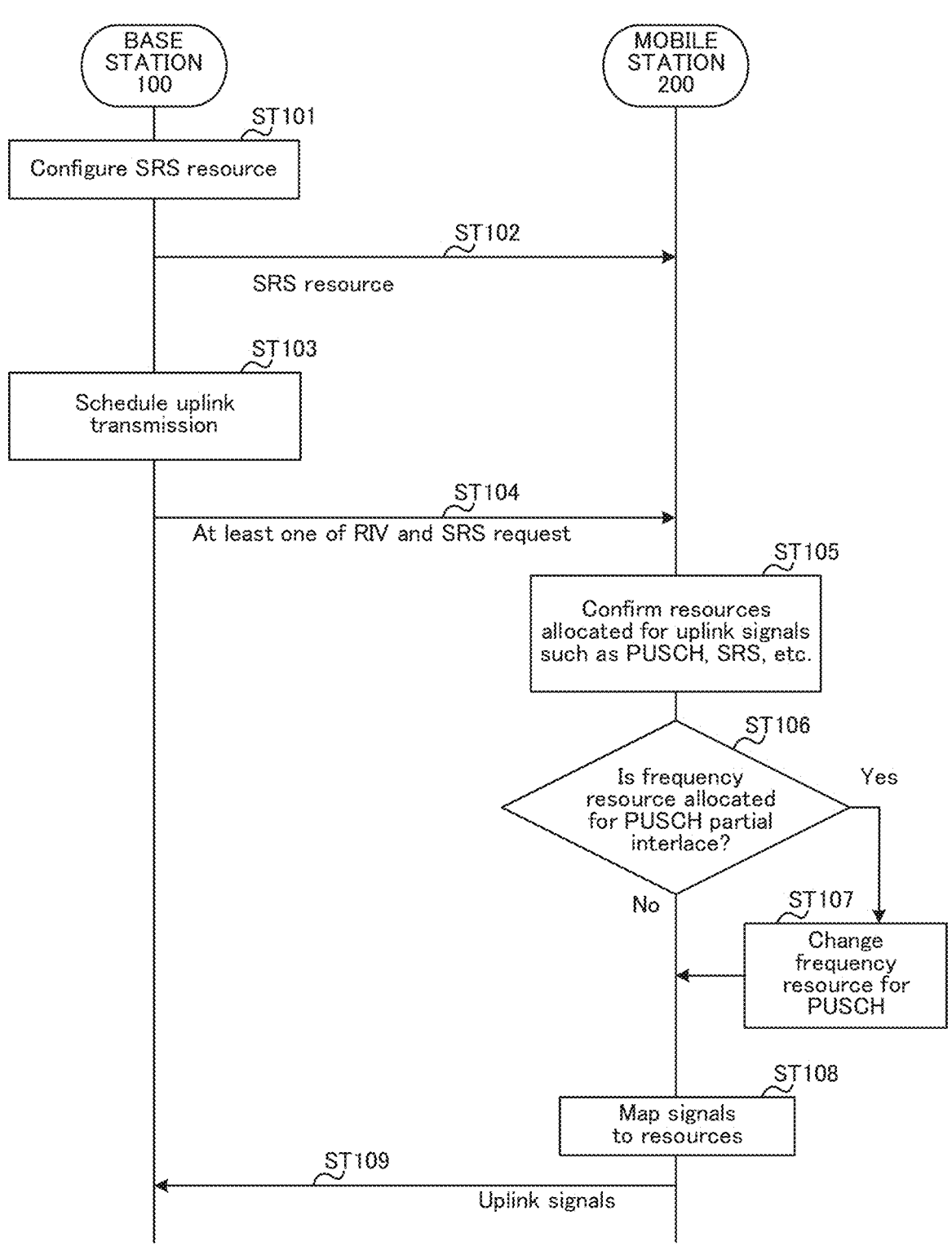
FIG. 7 is a sequence diagram describing a configuration example in the base station and the mobile station according to Embodiment 1.

FIG. 7 is a sequence diagram describing exemplary processing in base station 100 and mobile station 200.

By way of example, mobile station 200 transmits the SRS, and the PUSCH (the uplink data signal) to be allocated to the interlace based on the indication of base station 100 in FIG. 7.

In FIG. 7, base station 100 configures a higher layer parameter (e.g., a parameter of the SRS resource) (ST101).

Base station 100 indicates (i.e., configures) the SRS resources to mobile station 200 using, for example, at least one of the higher layer signal and the DCI (ST102). Note that the SRS resources may include, for example, information such as a position of the SRS in the time domain and the frequency domain, a cyclic shift number of the SRS sequence or a comb number.

Base station 100 schedules uplink transmission of the PUSCH and the SRS, for example (ST103).

Base station 100 indicates the transmission of the PUSCH and the SRS to mobile station 200 using, for example, the DCI (e.g., at least one of the RIV and the SRS request) (ST104). At this time, base station 100 may indicate, to mobile station 200, the interlace number to which the PUSCH is allocated using the RIV, for example. Base station 100 may also indicate, to mobile station 200, the SRS resource to be used for the SRS transmission in mobile station 200, among the SRS resources indicated by the higher layer signal, for example. The SRS resource may be indicated using an "SRS request" field to be described later, for example.

Mobile station 200 confirms the resources allocated for the uplink transmission such as the PUSCH and the SRS, based on the higher layer signal and the DCI indicated from base station 100 (ST105). For example, mobile station 200 confirms the interlace number indicated by the RIV and confirms the SRS resource indicated by the SRS request. In the present embodiment, the frequency resource allocated for the PUSCH is associated with, for example, a parameter for the SRS indicated by the DCI from base station 100.

Mobile station 200 determines whether the frequency resource allocated for the PUSCH is a "partial interlace" based on the resource allocated for the SRS, for example (ST106). A method of determining whether the resource is the "partial interlace" will be described later.

When the frequency resource to which the PUSCH is mapped (hereinafter, also referred to as a "frequency resource allocated for the PUSCH") is the "partial interlace" (Yes in ST106), mobile station 200 changes the frequency resource for the PUSCH from the frequency resource indicated from base station 100 (e.g., the resource of the entire interlace indicated by the RIV) to the partial interlace (ST107).

When the resource allocated for the PUSCH is not the "partial interlace" (No in ST106), in contrast, mobile station 200 does not change the frequency resource for the PUSCH from the resource of the entire interlace.

Mobile station 200 then maps the PUSCH (i.e., the uplink data signal) to the determined allocation resource, and maps the SRS to the resource indicated by the SRS request (ST108). Mobile station 200 transmits the uplink signals mapped to the allocated resources to, for example, base station 100 (ST109).

Hereinafter, Operation Example 1 and Operation Example 2 for the indication of resource allocation for the PUSCH will be described.

Operation Example 1

In Operation Example 1, the frequency resource allocated for the PUSCH is associated with, for example, the cyclic shift number of the SRS sequence, which is the SRS parameter indicated by the DCI from base station 100, configured for the SRS resource.

FIG. 8 illustrates exemplary SRS requests configured for mobile station 200.

In the example illustrated in FIG. 8, three patterns of SRS resources #1, #2, and #3 are configured for the SRS resource indicated by the SRS request. Note that the SRS resource is not limited to include three patterns, and two patterns or four or more patterns may be configured.

In addition, different values may be configured as the cyclic shift number of the SRS sequence for each SRS resource, for example. In the example illustrated in FIG. 8, cyclic shift number #1 is configured for SRS resource #1, cyclic shift number #2 for SRS resource #2, and cyclic shift number #3 for SRS resource #3.

Base station 100 indicates the SRS resource used by mobile station 200 for the SRS transmission by, for example, the SRS request field (any of 00 to 11) included in the DCI. Note that mobile station 200 does not transmit the SRS when the SRS request is "00".

Mobile station 200 determines the frequency resource allocated for the PUSCH based on the cyclic shift number of the SRS sequence configured by the SRS request. For example, mobile station 200 determines the frequency resource allocated for the PUSCH from the cyclic shift number of the SRS, based on the association between the cyclic shift number of the SRS and the frequency resource allocated for the PUSCH illustrated in FIG. 9.

Note that the example illustrated in FIG. 9 represents a case where each interlace includes 9 clusters (cluster numbers #0 to #8) as illustrated in FIG. 1.

The association between the cyclic shift number of the SRS and the frequency resource allocated for the PUSCH illustrated in FIG. 9 may be defined by a standard, for example, or may be configured for mobile station 200 by the higher layer signal, the DCI, or the like.

When the SRS resource of cyclic shift number #1 is configured for mobile station 200 in FIG. 9, mobile station 200 configures the entire interlace (e.g., cluster numbers #0 to #8) indicated by the RIV included in the DCI from base station 100 as the frequency resource allocated for the PUSCH.

Further, when the SRS resource of cyclic shift number #2 or #3 is configured for mobile station 200 in FIG. 9, mobile station 200 configures part of the frequency resource (i.e., some clusters) in the interlace indicated by the RIV included in the DCI from base station 100 as the frequency resource allocated for the PUSCH. In other words, in a case where SRS request="10" or "11" illustrated in FIG. 9, mobile station 200 changes from the allocation to the entire interlace indicated by the RIV to the partial interlace allocation.

For example, in a case of cyclic shift number #2, mobile station 200 maps the PUSCH to the frequency resource of cluster numbers #0 to #4 in the interlace (e.g., cluster numbers #0 to #8) indicated by the RIV. Additionally, in a case of cyclic shift number #3, for example, mobile station 200 maps the PUSCH to the frequency resource of cluster numbers #5 to #8 in the interlace (e.g., cluster numbers #0 to #8) indicated by the RIV.

As described above, in Operation Example 1, the frequency resource allocated for the PUSCH associated with at least one of the cyclic shift numbers of the SRS sequence (cyclic shift numbers #2 and #3 in FIG. 9), which are the parameters of the SRS resource indicated to mobile station 200 by the SRS request, is part of the frequency resource (e.g., partial interlace) in the frequency resource (e.g., interlace) for the PUSCH indicated by the DCI (e.g., RIV).

For example, base station 100 indicates the partial interlace allocation to mobile station 200 by the indication of SRS request="10" or "11" illustrated in FIG. 9. In other words, the partial interlace allocation for the PUSCH is implicitly indicated from base station 100 to mobile station 200 by the indication of the cyclic shift number of the SRS sequence in Operation Example 1.

Thus, Operation Example 1 enables base station 100 to indicate the partial interlace allocation for the PUSCH to mobile station 200 without an extra control signal for PUSCH allocation.

Note that Operation Example 1 has described a case of using the cyclic shift number for the identification of the frequency resource allocated for the PUSCH illustrated in FIG. 9, by way of example. However, the SRS parameter used for the identification of the frequency resource allocated for the PUSCH is not limited to the cyclic shift number, and may be another SRS parameter, such as a comb number or a temporal resource.

Operation Example 2

In Operation Example 2, the frequency resource allocated for the PUSCH is associated with, for example, the temporal position of the SRS, which is the SRS parameter indicated by the DCI from base station 100, configured for the SRS resource.

FIG. 10 illustrates exemplary SRS requests configured for mobile station 200.

In the example illustrated in FIG. 10, three patterns of SRS resources #1, #2, and #3 are configured for the SRS resource indicated by the SRS request. Note that the SRS resource is not limited to include three patterns, and two patterns or four or more patterns may be configured.

In addition, different values may be configured as the temporal position of the SRS for each SRS resource, for example. In the example illustrated in FIG. 10, temporal position #A is configured for SRS resource #1, temporal position #B for SRS resource #2, and temporal position #C for SRS resource #3.

Herein, temporal position #A indicates a "position (e.g., a symbol position) after the PUSCH mapped in the same slot", and temporal positions #B and #C indicate "positions before the PUSCH mapped in the same slot".

Base station 100 indicates the SRS resource used by mobile station 200 for the SRS transmission by, for example, the SRS request field (any of 00 to 11) included in the DCI. Note that mobile station 200 does not transmit the SRS when the SRS request is "00".

Mobile station 200 determines the frequency resource allocated for the PUSCH based on the temporal position of the SRS configured by the SRS request. For example, mobile station 200 determines the frequency resource allocated for the PUSCH from the temporal position of the SRS, based on the association between the temporal position of the SRS and the frequency resource allocated for the PUSCH illustrated in FIG. 11.

Note that the example illustrated in FIG. 11 indicates a case where each interlace includes 9 clusters (cluster numbers #0 to #8) as illustrated in FIG. 1.

The association between the temporal position of the SRS and the frequency resource allocated for the PUSCH illustrated in FIG. 11 may be defined by a standard, for example, or may be configured for mobile station 200 by the higher layer signal, the DCI, or the like.

When the SRS resource of temporal position #A is configured for mobile station 200 in FIG. 11, mobile station 200 configures the entire interlace (e.g., cluster numbers #0 to #8) indicated by the RIV included in the DCI from base station 100 as the frequency resource allocated for the PUSCH.

Further, when the SRS resource of temporal position #B or #C is configured for mobile station 200 in FIG. 11, mobile station 200 configures part of the frequency resource (i.e., some clusters) in the interlace indicated by the RIV included in the DCI from base station 100 as the frequency resource allocated for the PUSCH. In other words, in a case where SRS request="10" or "11" illustrated in FIG. 10, mobile station 200 changes from the allocation to the entire interlace indicated by the RIV to the partial interlace allocation.

For example, in a case of temporal position #B, mobile station 200 maps the PUSCH to the frequency resource of cluster numbers #0 to #4 in the interlace (e.g., cluster numbers #0 to #8) indicated by the RIV. Additionally, in a case of temporal position #C, for example, mobile station 200 maps the PUSCH to the frequency resource of cluster numbers #5 to #8 in the interlace (e.g., cluster numbers #0 to #8) indicated by the RIV.

As described above, in Operation Example 2, the frequency resource allocated for the PUSCH associated with at least one of the temporal positions of the SRS (temporal positions #B and #C before the PUSCH in FIG. 11), which are the parameters of the SRS resource indicated to mobile station 200 by the SRS request, is part (e.g., partial interlace) of the frequency resource (e.g., interlace) for the PUSCH indicated by the DCI (e.g., RIV).

For example, base station 100 indicates the partial interlace allocation to mobile station 200 by the indication of SRS request="10" or "11" illustrated in FIG. 10. In other words, the partial interlace allocation for the PUSCH is implicitly indicated from base station 100 to mobile station 200 by the indication of the temporal position of the SRS in Operation Example 2.

Thus, Operation Example 2 enables base station 100 to indicate the partial interlace allocation for the PUSCH to mobile station 200 without an extra control signal for PUSCH allocation.

For example, when mobile station 200 transmits the SRS in a broader band than the PUSCH in a symbol (i.e., at the temporal position) before the PUSCH mapped to the partial interlace in the same slot, the transmission power during at least the SRS transmission is greater than the transmission power during the PUSCH transmission. This causes another radio device around mobile station 200 (e.g., a radio device using the same unlicensed band) to be less likely to succeed in carrier sensing during the SRS transmission by mobile station 200 at least, and less likely to start transmitting a signal. Thus, base station 100 is highly likely to receive the SRS transmitted from mobile station 200 properly according to Operation Example 2, thereby improving the reception quality of uplink.

Note that a relation between the temporal positions of the PUSCH and the SRS is assumed to be a relation in the same slot in Operation Example 2. However, the above-described method may be applied based on the relation between the temporal positions of the PUSCH and the SRS in a time period of a different length. For example, when the PUSCH and the SRS are allocated over a plurality of consecutive slots by single DCI transmission, mobile station 200 may determine whether the PUSCH is allocated to the partial interlace according to the relation between the temporal positions of the SRS and "the PUSCH allocated by the same DCI".

Although Operation Example 2 has described a case of using the temporal position of the SRS for the determination of the frequency resource allocated for the PUSCH, combinations of the temporal position of the SRS and another parameter of the resource for the SRS, such as a cyclic shift number or a comb number, may be used for the determination of the frequency resource allocated for the PUSCH. In other words, Operation Example 2 may be combined with Operation Example 1. By way of example, FIG. 12 illustrates an example of using combinations of the temporal position of the SRS and the cyclic shift number of the SRS sequence for the determination of the frequency resource allocated for the PUSCH. As in FIG. 12, when the partial interlace allocation for the PUSCH is indicated by temporal position #B of the SRS, different clusters may be indicated as the clusters to which the PUSCH is mapped depending on the cyclic shift number of the SRS.

Further, Operation Example 2 has described the case where the partial interlace allocation is indicated when the temporal position of the SRS is before the PUSCH, but the partial interlace allocation may be indicated when the temporal position of the SRS is after the PUSCH.

Operation Example 1 and Operation Example 2 have been described, thus far.

As described above, the resources are associated between the SRS resource and the PUSCH in the present embodiment. Base station 100 and mobile station 200 determine the frequency resources to be used for the uplink transmission based on, for example, the resource association between the SRS and the PUSCH. Mobile station 200 then transmits at least one of the SRS and the PUSCH using the determined frequency resource.

For example, in terms of the association mentioned above, the frequency resource allocated for the PUSCH is associated with the SRS parameter indicated by the DCI (e.g., the cyclic shift number of the SRS sequence, the cyclic shift number of the SRS sequence, etc.) in the present embodiment. Further, the frequency resource allocated for the PUSCH associated with at least one of the parameters of the SRS is part of the interlace indicated by the DCI (e.g., RIV), that is, the partial interlace.

This allows base station 100 to implicitly indicate the partial interlace allocation for the PUSCH by the indication of the SRS resource. Thus, the present embodiment enables the indication of the partial interlace allocation for the PUSCH without increasing the signaling overhead. Therefore, it is possible to appropriately allocate the resources in the operation in unlicensed bands according to the present embodiment.

Variation 1 of Embodiment 1

In Embodiment 1, the partial interlace allocation for the PUSCH is based on dividing the interlace into partial interlaces of nearly the same size, such as cluster numbers

0 to #4 and cluster numbers #5 to #8, as illustrated in FIG. 9 and FIG. 11, for example. This allows equitable resource allocation for a plurality of mobile stations 200 allocated to each partial interlace.

However, the partial interlaces need not be configured to be nearly the same size. For example, the size of the partial interlaces may be different from each other, such as eight clusters of cluster numbers #0 to #7 and one cluster of cluster number #8. This allows flexible resource allocation for mobile station 200.

Note that the interlace may be divided into three or more partial interlaces in configuring the partial interlaces. This enables resource allocation based on the partial interlace for more mobile stations 200.

Variation 2 of Embodiment 1

In Embodiment 1, the partial interlace allocation for the PUSCH is based on dividing the interlace into partial interlaces including clusters adjacent to each other, such as cluster numbers #0 to #4 and cluster numbers #5 to #8, as illustrated in FIG. 9 and FIG. 11, for example.

However, the interlace may be divided into partial interlaces including clusters not adjacent to each other, such as clusters of cluster numbers #0, #2, #4, #6, and #8 (e.g., even numbered clusters) and clusters of cluster numbers #1, #3, #5, and #7 (e.g., odd numbered clusters), for example. This reduces the possibility of failing to receive all PRBs in the partial interlace in base station 100 even when the propagation characteristics of a particular frequency are poor due to an influence of phasing, for example.

Variation 3 of Embodiment 1

When the partial interlace allocation for the PUSCH is indicated to mobile station 200 in FIG. 11, for example, it may not be indicated which clusters in the interlace indicated by the RIV are used by mobile station 200. For example, mobile station 200 may map the PUSCH to the partial interlace including clusters determined without depending on the indication of base station 100. This makes it possible to reduce the number of patterns of the SRS resource for indicating the partial interlace from base station 100 to mobile station 200, thereby facilitating the system design.

Variation 4 of Embodiment 1

In Embodiment 1, the frequency resource to which the SRS is mapped may be selected from the resource to which the PUSCH in the same slot is allocated, as in Embodiment 2 or Embodiment 3 to be described below. For example, when the PUSCH is allocated to the entire interlace or the partial interlace, the SRS may be similarly mapped to the entire interlace or the partial interlace. In this case, the frequency resource for the SRS need not be indicated in advance by the higher layer parameter (e.g., the SRS resource) or the like, or may be configured ignoring the information of the frequency resource included in the SRS resource even when the information is indicated. Mapping the SRS to the interlace facilitates the frequency division multiplexing of the SRS with signals of other uplink channels such as the PUSCH, the PUCCH or the PRACH (e.g., transmitted by other mobile stations) allocated to the interlace, for example.

Embodiment 2

In the present embodiment, an indication method for interlace allocation for the SRS will be described.

Note that a base station and a mobile station according to the present embodiment have the same basic configurations as base station 100 and mobile station 200 according to Embodiment 1, and thus FIG. 5 and FIG. 6 will be used for the description.

In the present embodiment, the frequency resources for the SRS and the PUSCH are associated with each other. In terms of the association, the frequency resource to which the SRS is mapped is at least one of resources of the frequency resource (e.g., interlace) to which the PUSCH is mapped, for example.

Mobile station 200 derives a resource to map the SRS based on the resource information of the PUSCH, for example, in a case of transmitting the PUSCH and the SRS in uplink (referred to as NR-U uplink, for example) in an unlicensed band.

Figure 13:
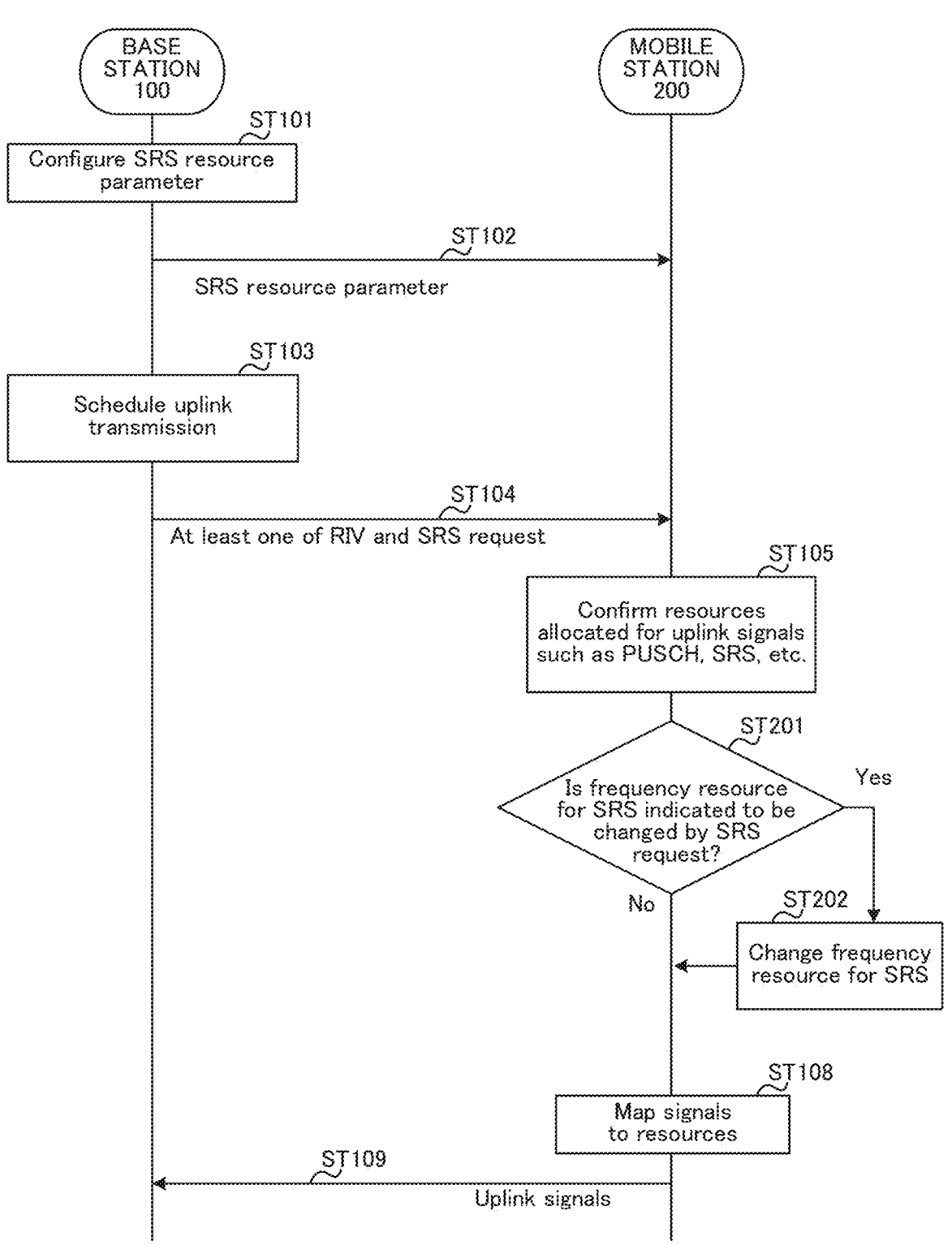
FIG. 13 is a sequence diagram describing a configuration example in the base station and the mobile station according to Embodiment 2.

FIG. 13 is a sequence diagram describing exemplary processing in base station 100 and mobile station 200. Note that the same reference signs are given to the same operations as those in Embodiment 1 (see, for example, FIG. 7) in FIG. 13, and descriptions thereof are omitted.

By way of example, mobile station 200 transmits the SRS, and the PUSCH (the uplink data signal) to be allocated to the interlace based on the indication of base station 100 in FIG. 13.

In FIG. 13, base station 100 indicates (or configures) a higher layer parameter (e.g., the parameter of the SRS resource) to mobile station 200 as in Embodiment 1 (ST102). Base station 100 also indicates the transmission of the PUSCH and the SRS to mobile station 200 using the DCI (e.g., at least one of the SRS request and the RIV) as in Embodiment 1 (ST104).

FIG. 14 illustrates exemplary SRS requests configured for mobile station 200.

In the example illustrated in FIG. 14, three patterns of SRS resources #1, #2, and #3 are configured for the SRS resource indicated by the SRS request. Note that the SRS resource is not limited to include three patterns, and two patterns or four or more patterns may be configured.

Further, in the example illustrated in FIG. 14, when SRS request="11" (i.e., SRS resource #3) is indicated to (or configured for) mobile station 200, it may be indicated that "the frequency resource for the SRS is selected from the frequency resource allocated for the PUSCH", i.e., "frequency mapping for the SRS is the same as frequency mapping for the PUSCH".

Herein, the interlace is allocated for the PUSCH. The interlace allocation for the SRS is thus indicated from base station 100 to mobile station 200 by the indication of SRS request="11" illustrated in FIG. 14. In other words, the indication of SRS request="11" indicates a change of the resource allocation for the SRS from the allocation based on the SRS resource to the interlace allocation for the SRS in FIG. 14.

In a case where SRS request="11" illustrated in FIG. 14, mobile station 200 changes the resource allocation for the SRS from the resource allocation based on SRS resource #3 indicated by the SRS request to the allocation to the frequency resource allocated for the PUSCH indicated by the RIV (i.e., the interlace allocation), for example.

In a case where SRS request="01" or "10" illustrated in FIG. 14, in contrast, mobile station 200 determines the resource allocation for the SRS based on SRS resource #1 or #2 indicated by the SRS request. In other words, in the case where SRS request="01" or "10" is indicated, the resource allocation for the SRS is not indicated to be changed in FIG. 14.

In FIG. 13, mobile station 200 determines whether the resource for the SRS is indicated to be changed based on the value in the SRS request field indicated from base station 100 (ST201). As described above, in the example illustrated in FIG. 14, mobile station 200 determines that the resource for the SRS is indicated to be changed when SRS request="11" (Yes in ST201). Meanwhile, in the example illustrated in FIG. 14, mobile station 200 determines that the resource for the SRS is not indicated to be changed when SRS request="01" or "10" (No in ST201).

When the resource for the SRS is not indicated to be changed in FIG. 13, (No in ST201), mobile station 200 uses, for the SRS transmission, the frequency resource included in the SRS resource (e.g., SRS resource #1 or #2 illustrated in FIG. 14) indicated by the SRS request, for example.

In contrast, when the resource for the SRS is indicated to be changed (Yes in ST201), mobile station 200 changes the frequency resource for the SRS from the frequency resource indicated by the SRS request (e.g., SRS resource #3 illustrated in FIG. 14) to the frequency resource selected from the frequency resource allocated for the PUSCH indicated by the RIV (ST202). In other words, mobile station 200 may ignore the information on the frequency resource included in SRS resource #3.

When the PUSCH is mapped to interlace #0 in the example illustrated in FIG. 1, for example, mobile station 200 may map the SRS to part or all of the PRBs belonging to interlace #0 as for the PUSCH in the case where SRS resource #3 is indicated by the SRS request ("11"). Note that mobile station 200 determines resources other than the frequency resource for the SRS (e.g., a temporal position, a cyclic shift number, a comb number, etc.) based on parameters included in SRS resource #3 indicated by the SRS request ("11").

That is, when the parameter of the SRS (e.g., the SRS resource) indicated by the DCI (or the SRS request) is a specific value (e.g., SRS resource #3 illustrated in FIG. 14), the frequency resource to which the SRS is mapped is at least one of the resources of the frequency resource allocated for the PUSCH. Meanwhile, the resources other than the frequency resource configured for the SRS (e.g., the temporal position, the cyclic shift number, the comb number, etc.) are determined based on the specific value (e.g., SRS resource #3 illustrated in FIG. 14).

Note that the frequency resource used for the SRS among the PRBs belonging to the interlace allocated for the PUSCH (e.g., some or all of the PRBs) may be separately indicated to mobile station 200, specified in advance, or individually determined by mobile station 200.

As described above, the resources are associated between the SRS resource and the PUSCH in the present embodiment. Base station 100 and mobile station 200 determine the frequency resources to be used for the uplink transmission based on, for example, the resource association between the SRS and the PUSCH. In the present embodiment, for example, when the SRS resource (i.e., the value of the SRS request) indicated to mobile station 200 by the SRS request is a specific value, the frequency resource to which the SRS is mapped is at least part of the frequency resource (e.g., the interlace) allocated for the PUSCH indicated by the DCI (e.g., RIV).

This allows base station 100 to indicate the interlace allocation for the SRS to mobile station 200, for example, by the indication of SRS request="11" illustrated in FIG. 14. In other words, the indication of the SRS request enables switching between the interlace allocation for the SRS and the normal frequency resource allocation for the SRS according to the present embodiment.

As described above, the present embodiment allows base station 100 to indicate the interlace allocation for the SRS to mobile station 200 without an extra control signal for SRS allocation. Thus, it is possible to appropriately allocate the resources in the operation in unlicensed bands according to the present embodiment.

Variation 1 of Embodiment 2

The PUSCH is not limited to be allocated to a single interlace, and may be allocated to a plurality of interlaces.

In Embodiment 2, when the frequency resource for the SRS is selected from the frequency resource to which the PUSCH is allocated, and the PUSCH is allocated to a plurality of interlaces, the SRS may be mapped to some, not all, of the interlaces to which the PUSCH is allocated.

For example, the SRS may be mapped to a single interlace with the smallest or largest interlace number among the plurality of interlaces to which the PUSCH is allocated. When the PUSCH is allocated to interlaces #0 and #1, for example, the SRS may be mapped to the PRBs belonging to either one of interlace #0 or #1. This allows the SRS to be allocated to minimum resources, thus improving the resource utilization efficiency and, for example, increasing resources available to other mobile stations.

Variation 2 of Embodiment 2

Embodiment 2 has described the case where "the frequency resource for the SRS is selected from the frequency resource allocated for the PUSCH" is indicated by one value of the SRS request ("11" in FIG. 14). However, "the frequency resource for the SRS is selected from the frequency resource allocated for the PUSCH" may be indicated by a plurality of values of the SRS request. This enables configuring more resources for the SRS in mobile station 200, in addition to the effects described in Embodiment 2. The resources include, for example, the same frequency resource as the PUSCH, and other resources (e.g., the cyclic shift number, the temporal position, etc.) that are different for each SRS request.

Further, the SRS resource associated with the SRS request for indicating that "the frequency resource for the SRS is selected from the frequency resource allocated for the PUSCH" may be the same as the SRS resource associated with a different SRS request from that SRS request. For example, SRS resource #1 or #2 may be indicated by the indication of SRS request="11" in FIG. 14, instead of SRS resource #3. This reduces the number of the SRS resources to be configured in advance, thereby reducing higher layer signaling.

Variation 3 of Embodiment 2

Embodiment 2 has described the case where the frequency resource for the SRS is selected from the frequency resource allocated for the PUSCH. The frequency resource for the SRS, however, may be selected from other than the frequency resource allocated for the PUSCH, as long as a rule is followed to prevent collision of the frequency resources for the SRSs among different mobile stations 200.

The rule described above may include, for example, "mapping the SRS to the interlace with the number of the smallest (or largest) number+N (N can be any integer) among the interlace numbers to which the PUSCH is allocated".

Embodiment 3

[Carrier Sense]

In unlicensed bands, it is required to ensure that no surrounding radio devices are transmitting signals in the same frequency band by each radio device performing carrier sensing before transmitting a signal, in order to prevent interference among radio devices.

In NR-U, it is assumed to use carrier sense such as Listen Before Talk (LBT) category 4 (or Type 1 UL channel access procedure), and LBT category 2 (or Type 2 UL channel access procedure), as in eLAA (see, for example, NPL 6). In the LBT category 2, a period of performing carrier sensing (e.g., also referred to as LBT duration), is fixed to 25 microseconds, for example. In the LBT category 4, the period of performing carrier sensing is 25 microseconds or longer, for example, and can be randomly determined.

It is also assumed in the LBT category 4 that a range of values configurable for the length of the period of performing carrier sensing is determined by, for example, a parameter called a "channel access priority class". For example, the greater the value of the channel access priority class is, the greater the value indicating the length of the period of performing carrier sensing can be.

In the present embodiment, an indication method for the interlace allocation for the SRS in consideration of the carrier sense will be described.

Note that a base station and a mobile station according to the present embodiment have the same basic configuration as base station 100 and mobile station 200 according to Embodiment 1, and thus FIG. 5 and FIG. 6 will be used for the description.

In the present embodiment, the frequency resources for the SRS and the PUSCH are associated with each other as in Embodiment 2. In terms of the association, the frequency resource to which the SRS is mapped is at least one of resources of the frequency resource (e.g., interlace) to which the PUSCH is mapped, for example.

Further, mobile station 200 derives a resource to map the SRS based on a type of the carrier sense and the resource information of the PUSCH in a case of transmitting the PUSCH and the SRS in uplink (e.g., NR-U uplink) in an unlicensed band, for example.

Figure 15:
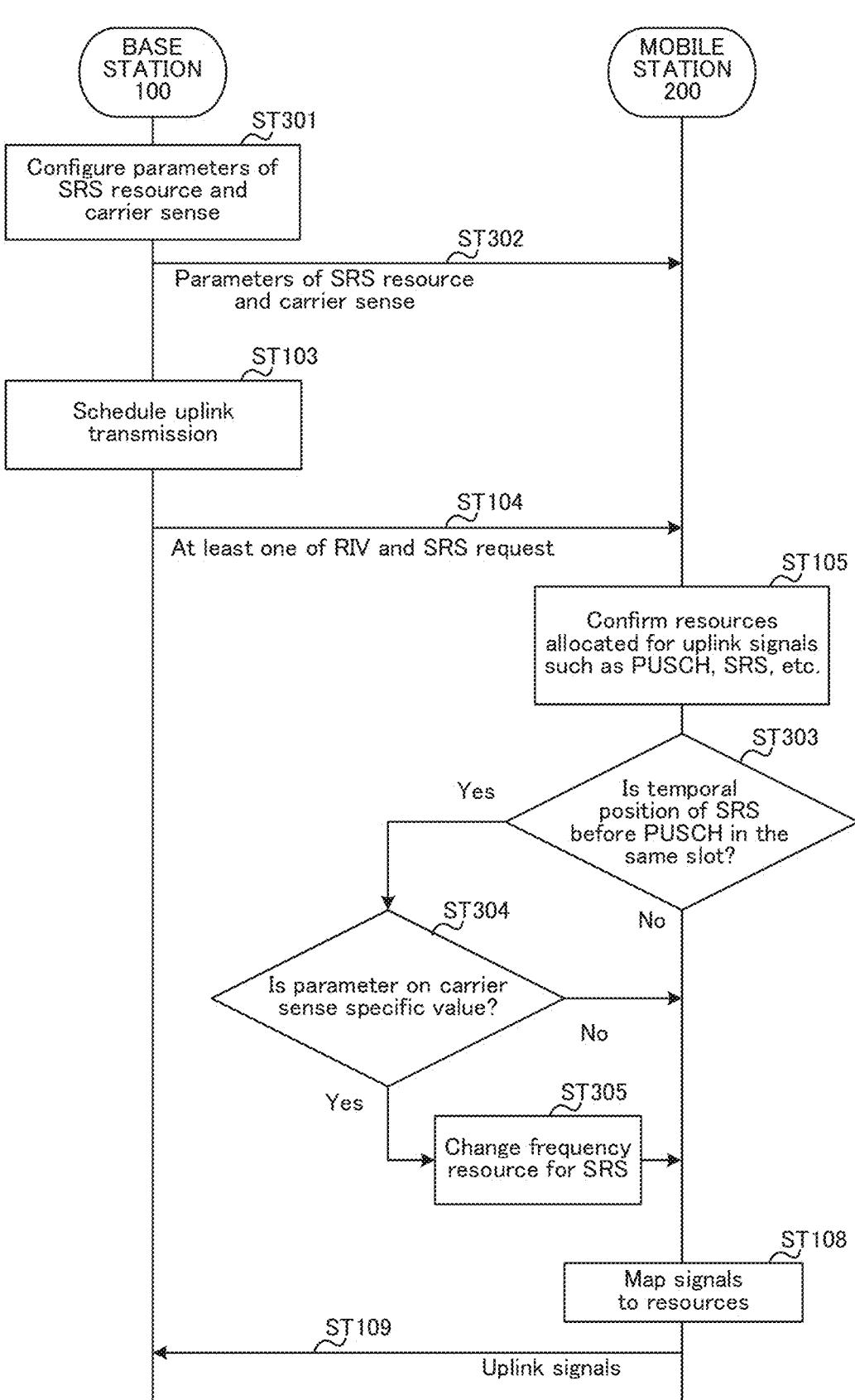
FIG. 15 is a sequence diagram describing a configuration example in the base station and the mobile station according to Embodiment 3.

FIG. 15 is a sequence diagram describing exemplary processing in base station 100 and mobile station 200. Note that the same reference signs are given to the same operations as those in Embodiment 1 (see, for example, FIG. 7) in FIG. 15, and descriptions thereof are omitted.

By way of example, mobile station 200 transmits the SRS, and the PUSCH (the uplink data signal) to be allocated to the interlace based on the indication of base station 100 in FIG. 15.

In FIG. 15, base station 100 configures, as higher layer parameters, a parameter on the SRS resource and a parameter on the carrier sense performed by mobile station 200 before uplink transmission, for example (ST301). The parameter on the carrier sense may include, for example, a parameter on the length of the period of performing carrier sensing (e.g., the channel access priority class or the LBT category).

Base station 100 indicates (or configures) the parameters on the SRS resource and the carrier sense, which are the higher layer parameters, to mobile station 200 (ST302).

Base station 100 also indicates the transmission of the PUSCH and the SRS to mobile station 200 using the DCI (e.g., at least one of the SRS request and the RIV) as in Embodiment 1 (ST104).

FIG. 16 illustrates exemplary SRS requests configured for mobile station 200.

In the example illustrated in FIG. 16, three patterns of SRS resources #1, #2, and #3 are configured for the SRS resource indicated by the SRS request. The SRS resource parameter is not limited to include three patterns, and two patterns or four or more patterns may be configured.

The configuration of each SRS resource may include, for example, a temporal position and a frequency position of the SRS, and a cyclic shift number of the SRS sequence. In addition, different values may be configured as the temporal position of the SRS for each SRS resource, for example. In the example illustrated in FIG. 16, temporal position #A is configured for SRS resource #1, temporal position #B for SRS resource #2, and temporal position #C for SRS resource #3.

In FIG. 15, mobile station 200 determines whether the SRS is mapped to a symbol before the PUSCH (i.e., at an earlier temporal position) in the same slot, based on the temporal position of the SRS indicated by the SRS resource indicated by the SRS request from base station 100 (ST303).

Mobile station 200 also determines whether the period of performing carrier sensing is longer than a threshold, based on the parameter on the carrier sense indicated in ST302 (ST304).

For example, mobile station 200 may determine that the period of performing carrier sensing is longer than the threshold when the parameter on the carrier sense is a specific value. By way of example, mobile station 200 may determine that the period of performing carrier sensing is longer than the threshold in a case of the LBT category 4 and channel access priority class=4.

Note that the specific value is not limited to the LBT category 4 and channel access priority class=4, and may be another value. In addition, the determination of whether the period of performing carrier sensing is longer than the threshold is not limited to be based on the LBT category and the channel access priority class, and may be based on another parameter such as a calculated value of the period of performing carrier sensing.

In FIG. 15, when the SRS is not mapped to the symbol before the PUSCH in the same slot (No in ST303), or when the period of performing carrier sensing is equal to or less than the threshold (No in ST304), mobile station 200 uses the frequency resource included in the SRS resource indicated by the SRS request, for example, for the SRS transmission.

In contrast, when the SRS is mapped to the symbol before the PUSCH in the same slot (Yes in ST303) and the period of performing carrier sensing is longer than the threshold (Yes in ST304), mobile station 200 changes the frequency resource for the SRS from the frequency resource indicated by the SRS request (e.g., the SRS resource illustrated in FIG. 16) to the frequency resource selected from the frequency resource allocated for the PUSCH indicated by the RIV (ST305). In other words, mobile station 200 may ignore the information on the frequency resource included in the SRS resource.

When the PUSCH is mapped to interlace #0 in the example illustrated in FIG. 1, for example, mobile station 200 may map the SRS to part or all of the PRBs belonging to interlace #0. Note that mobile station 200 determines resources other than the frequency resource for the SRS (e.g., the temporal position, the cyclic shift number, the comb number, etc.) based on parameters included in the SRS resource indicated by the SRS request.

That is, when the SRS is mapped to the temporal position before the PUSCH in the same slot, and the period of performing carrier sensing is longer than the threshold, the frequency resource to which the SRS is mapped is at least one of the resources of the frequency resource allocated for the PUSCH. Meanwhile, the resources other than the frequency resource configured for the SRS (e.g., the temporal position, the cyclic shift number, the comb number, etc.) are determined based on the parameters indicated by the SRS request.

Note that the frequency resource used for the SRS among the PRBs belonging to the interlace allocated for the PUSCH (e.g., some or all of the PRBs) may be separately indicated to mobile station 200, specified in advance, or individually determined by mobile station 200.

Herein, when mobile station 200 needs to acquire a longer COT with single carrier sensing, for example, a longer period is likely to be configured for performing carrier sensing (see, for example, NPL 6). The longer the period of performing carrier sensing is, the more likely it is to detect signals from other radio devices, and mobile station 200 is more likely to fail the carrier sensing accordingly. Thus, a longer period of performing carrier sensing causes more time for mobile station 200 to start transmitting a signal, thereby increasing a possibility of delay of the SRS transmission.

Further, configuring different cyclic shifts, for example, for the SRS sequences among different mobile stations (or radio devices) makes the SRSs orthogonal to each other, and thus the different mobile stations can transmit the SRSs respectively in the same frequency resource, for example. The SRS and the PUSCH, however, have no such orthogonal relation among the SRSs described above. Collision thus occurs when the SRS of mobile station 200 and a signal (e.g., PUSCH) of another radio device are transmitted in the same frequency resource.

For example, when the SRS is mapped to the symbol before the PUSCH in the same slot in mobile station 200, and the SRS transmission is delayed due to a failure of carrier sensing, the SRS is likely to collide with the PUSCH transmitted by another radio device.

In this regard, the SRS is mapped to, for example, the interlace allocated for the PUSCH in the present embodiment when the transmission of the SRS mapped earlier than the PUSCH is likely to be delayed due to carrier sensing. This reduces the possibility where the frequency resource for the SRS transmitted by mobile station 200 and the frequency resource for the signal (e.g., PUSCH) transmitted by another radio device overlap with each other. Thus, the collision between the SRS transmitted by mobile station 200 and the PUSCH transmitted by another radio device is less likely to occur even with the delay of the SRS transmission.

As described above, the resources are associated between the SRS resource and the PUSCH in the present embodiment. Base station 100 and mobile station 200 determine the frequency resources to be used for the uplink transmission based on, for example, the resource association between the SRS and the PUSCH. In the present embodiment, for example, when the SRS is mapped to the symbol before the PUSCH and the period of performing carrier sensing is longer than the threshold, the frequency resource to which the SRS is mapped is at least part of the frequency resource (e.g., interlace) allocated for the PUSCH indicated by the DCI (e.g., RIV).

This allows base station 100 to indicate the interlace allocation for the SRS to mobile station 200, for example, according to the SRS request (e.g., the temporal position of the SRS) and the parameter on the carrier sense. In other words, the indication of the SRS request and the parameter on the carrier sense enables switching between the interlace allocation for the SRS and the normal frequency resource allocation for the SRS according to the present embodiment.

As described above, the present embodiment allows base station 100 to indicate the interlace allocation for the SRS to mobile station 200 without an extra control signal for SRS allocation. Therefore, it is possible to appropriately allocate the resources in the operation in unlicensed bands according to the present embodiment.

Variation 1 of Embodiment 3

In Embodiment 3, the determination criteria (or conditions) for whether the period of performing carrier sensing is longer than the threshold adopt the conditions where "the temporal position of the SRS is before the PUSCH in the same slot" and "the period of performing carrier sensing is longer than the threshold".

These conditions, however, may be replaced with conditions where "the temporal position of the SRS is before the PUSCH in the same slot" and "the previous carrier sensing in the COT has failed", for example. When the above conditions are satisfied, mobile station 200, for example, may change the frequency resource for the SRS from the frequency resource indicated by the SRS request to the frequency resource selected from the frequency resource allocated for the PUSCH (e.g., ST305 in FIG. 15). In this case, base station 100 may determine the frequency resource for the SRS (e.g., either one of the resource indicated by the SRS request or the frequency resource allocated for the PUSCH) using a determination criterion of, for example, "whether reception of the allocated SRS is delayed". This allows the determination of the frequency resource for the SRS based more faithfully on the delay of the SRS transmission due to the failure of carrier sensing.

Variation 2 of Embodiment 3

The PUSCH is not limited to be allocated to a single interlace, and may be allocated to a plurality of interlaces.

In Embodiment 3, when the frequency resource for the SRS is selected from the frequency resource to which the PUSCH is allocated, and the PUSCH is allocated to a plurality of interlaces, the SRS may be mapped to some, not all, of the interlaces to which the PUSCH is allocated.

For example, the SRS may be mapped to a single interlace with the smallest or largest interlace number among the plurality of interlaces to which the PUSCH is allocated. When the PUSCH is allocated to interlaces #0 and #1, for example, the SRS may be mapped to the PRBs belonging to either one of interlace #0 or #1. This allows the SRS to be allocated to minimum resources, thus improving the resource utilization efficiency and, for example, increasing resources available to other mobile stations.

Variation 3 of Embodiment 3

Embodiment 3 has described the case where the frequency resource for the SRS is selected from the frequency resource allocated for the PUSCH. The frequency resource for the SRS, however, may be selected from other than the frequency resource allocated for the PUSCH, as long as a rule is followed to prevent collision of the frequency resources for the SRSs among different mobile stations 200.

The rule described above may include, for example, "mapping the SRS to the interlace with the number of the smallest (or largest) number+N (N can be any integer) among the interlace numbers to which the PUSCH is allocated".

Each embodiment of the present disclosure has been described, thus far.

Other Embodiments

Each of the above embodiments are based on the relation between the SRS and the PUSCH resource in the uplink where the mobile station is a transmitter and the base station is a receiver. However, an embodiment of the present disclosure is not limited thereto, and may be applied to a relation between a downlink reference signal and a downlink channel resource in downlink where the base station is a transmitter and the mobile station is a receiver. Additionally, an embodiment of the present disclosure may be applied to communication between the mobile stations such as vehicle-to-vehicle communication (i.e., a relation between a reference signal and a channel resource in sidelink), or other communication.

Further, each of the above embodiments has described the case where the SRS request field included in the DCI includes 2 bits, but the size of the SRS request may be another number of bits. For example, the SRS request field may be extended to 3 bits or more.

In addition, when the frequency resource allocated for the PUSCH or the SRS are changed in each embodiment described above, the number of subcarriers to which the PUSCH or the SRS is mapped may be adjusted to a number not including a prime factor other than 2, 3, and 5. This case reduces computational complexity of Discrete Fourier Transform (DFT) when the PUSCH or the SRS is transmitted by a transmitter including a DFT section (not illustrated).

The mapping relation between the PUSCH and the SRS has been described in each of the above embodiments, but it is not limited to the PUSCH and may be another uplink channel. For example, the above embodiments may be applied to the mapping relation between the PUCCH, the PRACH, or a combination of a plurality of channels and the SRS. For example, a resource to which at least one of the PUSCH, the PUCCH, and the PRACH is mapped may be indicated in association with allocation information for the SRS. Alternatively, the resource to which the SRS is mapped may be indicated in association with allocation information for at least one of the PUSCH, the PUCCH and the PRACH, for example.

In each embodiment described above, the case where a single SRS resource is indicated by a single value of the SRS request has been described. However, a plurality of SRS resources (e.g., the SRS resource set) may be indicated by a single value of the SRS request. In Embodiment 1, for example, a plurality of SRS resources with different cyclic shift numbers may be indicated by a certain SRS request. In this case, mobile station 200 may determine the frequency resource allocated for the PUSCH based on the cyclic shift number included in at least one of the plurality of SRS resources. For example, mobile station 200 may determine the frequency resource allocated for the PUSCH based on the smallest or largest number among the cyclic shift numbers included in the plurality of SRS resources. Alternatively, mobile station 200 may determine the frequency resource allocated for the PUSCH based on the cyclic shift number included in the SRS resource with the smallest or largest identification number (also referred to as an SRS resource ID) among the plurality of SRS resources, for example.

Further, a plurality of SRS resource sets may be indicated by the SRS request in each of the above embodiments. Also, some of the parameters of the SRS request may be configured to be unused (e.g., reserved) for new applications envisioned in the future.

Each of the above embodiment has described the case where the SRS transmission is indicated by the DCI or the like (i.e., the aperiodic SRS). An embodiment of the present disclosure, however, is not limited to the aperiodic SRS, and may be applied to another signal (e.g., a reference signal or a synchronization signal). For example, an embodiment of the present disclosure may be applied to the SRS resource used for transmitting a periodic SRS or a semi-persistent SRS indicated by the higher layer or the like. An embodiment of the present disclosure may also be applied to the following reference signals other than the SRS, for example:

Channel State Information-Reference Signal (CSI-RS);
DeModulation Reference Signal (DMRS);
Phase Tracking-Reference Signal (PT-RS);
Tracking Reference Signal (TRS);
Discovery Signal/Discovery Reference Signal (DRS);
Primary Synchronization Signal (PSS); and
Secondary Synchronization Signal (SSS).

Each of the above embodiments has described the case where the SRS is transmitted in the same slot as the PUSCH. However, an embodiment of the present disclosure is not limited to this, and may be applied to the SRS in a slot or COT where no PUSCH is transmitted. In Embodiments 2 and 3, for example, when the SRS request indicates a certain value, mobile station 200 may change the frequency resource for the SRS in the slot or the COT where no PUSCH is transmitted to the frequency resource selected from the frequency resource allocated for the PUSCH that mobile station 200 has previously transmitted, e.g., the most recently transmitted.

Further, an embodiment of the present disclosure may be applied to the transmission of an uplink channel (e.g., the PUCCH or the PRACH) whose transmission is indicated by the DCI or the like, instead of the reference signal. For example, a resource to which the PUSCH is mapped may be indicated in association with the allocation information for the PUCCH or the PRACH, and a resource to which the PUCCH or the PRACH is mapped may be indicated in association with the allocation information for the PUSCH.

Further, each of the above embodiments has assumed the case where the number of clusters is 9, M=12, and N=8 or 9 as an example of the configuration of the interlace. The interlace may have another configuration, however. The configuration of the interlace (e.g., values of N and M) may be configured in advance for each subcarrier spacing by a standard, or may be configured (or indicated) by at least one of the higher layer signal and the control signal.

Furthermore, each of the above embodiments has described the case of dispersedly arranging PRBs at equal intervals in the frequency domain, as an example of the configuration of the interlace. The configuration of the interlace is not limited to this, however. For example, the interlace need not be configured in units of PRBs, and may have a configuration such that groups of less than 12 subcarriers (e.g., a sub-PRB or a fractional PRB) or units of a single subcarrier are dispersedly arranged in the frequency domain. In addition, the resources may be dispersedly arranged in the interlace at equal intervals or unequal intervals.

In each embodiment described above, the "higher layer signal" is sometimes referred to as "RRC signaling" or "MAC signaling", for example.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a radio LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A mobile station according to an embodiment of the present disclosure includes: control circuitry, which, in operation, determines a frequency resource used for uplink transmission based on association of resources between a reference signal of uplink and an uplink signal other than the reference signal; and transmission circuitry, which, in operation, transmits at least one of the reference signal and/or the uplink signal using the frequency resource.

In the mobile station according to an embodiment of the present disclosure, with regard to the association, the frequency resource to which the uplink signal is mapped is associated with a parameter of the reference signal, the parameter being indicated by control information.

In the mobile station according to an embodiment of the present disclosure, the frequency resource associated with at least one of a plurality of the parameters is a part of the frequency resource for the uplink signal indicated by the control information.

In the mobile station according to an embodiment of the present disclosure, the at least one of the plurality of parameters indicates a temporal position to which the reference signal is mapped, and the part of the frequency resource is associated with the at least one of the plurality of parameters indicating a first temporal position, the first temporal position being a temporal position prior to the uplink signal.

In the mobile station according to an embodiment of the present disclosure, with regard to the association, the frequency resource to which the reference signal is mapped is at least one of resources of the frequency resource which is indicated by the control information and which the uplink signal is mapped to.

In the mobile station according to an embodiment of the present disclosure, when a parameter of the reference signal indicated by the control information is a specific value, the frequency resource to which the reference signal is mapped is the at least one of the resources, and a resource other than the frequency resource is determined based on the specific value, the resource being configured for the reference signal.

In the mobile station according to an embodiment of the present disclosure, the frequency resource to which the reference signal is mapped is the at least one of the resources, when the reference signal is mapped to a temporal position prior to the temporal position of the uplink signal, and when a period of performing carrier sensing is longer than a threshold.

In the mobile station according to an embodiment of the present disclosure, the frequency resource to which the reference signal is mapped is the at least one of the resources, when the reference signal is mapped to a temporal position prior to the temporal position of the uplink signal, and when carrier sensing has failed.

A base station according to an embodiment of the present disclosure includes: control circuitry, which, in operation, determines a frequency resource used for uplink transmission based on association of resources between a reference signal of uplink and an uplink signal other than the reference signal; and reception circuitry, which, in operation, receives at least one of the reference signal and/or the uplink signal using the frequency resource.

A transmission method according to an embodiment of the present disclosure includes: determining a frequency resource used for uplink transmission based on association of resources between a reference signal of uplink and an uplink signal other than the reference signal; and transmitting at least one of the reference signal and/or the uplink signal using the frequency resource.

A reception method according to an embodiment of the present disclosure includes: determining a frequency resource used for uplink transmission based on association of resources between a reference signal of uplink and an uplink signal other than the reference signal; and receiving at least one of the reference signal and/or the uplink signal using the frequency resource.

This application is entitled to and claims the benefit of Japanese Patent Application No. 2019-001858 dated Jan. 9, 2019, the disclosure of which including the specification, drawings and abstract is incorporated herein by reference in its entirety.

INDUSTRIAL APPLICABILITY

An exemplary embodiment of the present disclosure is useful for mobile communication systems.

REFERENCE SIGNS LIST

100 Base station
101, 205 Controller
102, 207 Encoder/modulator
103, 208 Signal mapper
104, 209 Transmission section
105, 201 Antenna
106, 202 Reception section
107, 203 Signal separator
108, 204 Demodulator/decoder
109 Channel quality estimator
200 Mobile station
206 SRS generator
The invention claimed is:

1. An integrated circuit, comprising:
reception circuitry, which, in operation, controls receiving control information relating to a first resource used for a sidelink signal other than a reference signal;
determination circuitry, which, in operation, controls determining the first resource used for the sidelink signal based on the control information, and determines a second resource used for the reference signal,
wherein the determination circuitry determines the second resource based on the first resource in a first case and determines the second resource without using the first resource in a second case,
wherein, in the first case, the second resource when the control information indicates a first value for the first resource is different from the second resource when the control information indicates a second value for the first resource; and
transmission circuitry, which, in operation, controls transmitting the reference signal.

2. The integrated circuit according to claim 1, wherein, the transmission circuitry, in operation, transmits the reference signal within a slot and transmits the sidelink signal within the slot.

3. The integrated circuit according to claim 1, wherein, the second resource to which the reference signal is mapped is at least one of resources indicated by another control information.

4. A transmission method, comprising:
receiving control information relating to a first resource used for a sidelink signal other than a reference signal;
determining the first resource based on the control information, and determining a second resource used for the reference signal,
wherein the second resource is determined based on the first resource in a first case and is determined without using the first resource in a second case,
wherein, in the first case, the second resource when the control information indicates a first value for the first resource is different from the second resource when the control information indicates a second value for the first resource; and
transmitting at least one of the sidelink signal or the reference signal.

5. The transmission method according to claim 4, comprising:
transmitting the reference signal within a slot and transmitting the sidelink signal within the slot.

6. A communication apparatus, comprising:
a receiver, which in operation, receives control information relating to a first resource used for a sidelink signal other than a reference signal;
circuitry, which in operation, determines the first resource based on the control information, and determines a second resource used for the reference signal,
wherein the second resource is determined based on the first resource in a first case and is determined without using the first resource in a second case,
wherein, in the first case, the second resource when the control information indicates a first value for the first resource is different from the second resource when the control information indicates a second value for the first resource; and
a transmitter, which in operation, transmits at least one of the sidelink signal or the reference signal.

7. The communication apparatus according to claim 6, wherein, the transmission circuitry, in operation, transmits the reference signal within a slot and transmits the sidelink signal within the slot.

* * * * *